(12) United States Patent
Berry et al.

(10) Patent No.: US 10,385,547 B2
(45) Date of Patent: Aug. 20, 2019

(54) SYSTEM AND METHOD FOR DETERMINING LOAD DISTRIBUTION ON A MACHINE

(71) Applicant: Caterpillar Inc., Peoria, IL (US)

(72) Inventors: Jeffrey K. Berry, Yorkville, IL (US); Qi Li, Peoria, IL (US); Dinny Jacob, Plainfield, IL (US); Randall D. Pruitt, Washington, IL (US)

(73) Assignee: Caterpillar Inc., Deerfield, IL (US)

( * ) Notice: Subject to any disclaimer, the term of this patent is extended or adjusted under 35 U.S.C. 154(b) by 105 days.

(21) Appl. No.: 15/643,095

(22) Filed: Jul. 6, 2017

(65) Prior Publication Data

US 2018/0179739 A1    Jun. 28, 2018

Related U.S. Application Data

(60) Provisional application No. 62/438,882, filed on Dec. 23, 2016.

(51) Int. Cl.
| | |
|---|---|
| *E02F 9/26* | (2006.01) |
| *E02F 3/34* | (2006.01) |
| *E02F 3/43* | (2006.01) |
| *G01L 5/00* | (2006.01) |
| *G01L 5/16* | (2006.01) |
| *G05B 15/02* | (2006.01) |

(52) U.S. Cl.
CPC .......... *E02F 9/265* (2013.01); *E02F 3/34* (2013.01); *E02F 3/431* (2013.01); *G01L 5/0071* (2013.01); *G01L 5/16* (2013.01); *G05B 15/02* (2013.01)

(58) Field of Classification Search
None
See application file for complete search history.

(56) References Cited

U.S. PATENT DOCUMENTS

| | | | |
|---|---|---|---|
| 5,004,064 A | 4/1991 | Tezuka et al. | |
| 5,099,944 A | 3/1992 | Kageyama et al. | |
| 5,167,287 A * | 12/1992 | Pomies .................. | G01G 19/10 177/1 |
| 6,234,254 B1 | 5/2001 | Dietz et al. | |
| 7,867,136 B2 | 1/2011 | Schifferer | |
| 8,825,314 B2 | 9/2014 | Jensen | |
| 2006/0245896 A1 | 11/2006 | Alshaer et al. | |

(Continued)

FOREIGN PATENT DOCUMENTS

| | | |
|---|---|---|
| CN | 105539202 A | 5/2016 |
| WO | WO 2009/073128 A2 | 6/2009 |

*Primary Examiner* — Mussa A Shaawat
*Assistant Examiner* — Abdhesh K Jha
(74) *Attorney, Agent, or Firm* — Leydig, Voit & Mayer, LTD.

(57) ABSTRACT

A machine includes a frame supported on at least a first axle and a second axle and a work implement that is hydraulically powered to be displaced with respect to the frame. A powertrain disposed on the machine generates a first force for propelling the machine with respect to the ground. The machine can include an electronic controller that communicates with the powertrain and a hydraulic sensor on the hydraulic actuator. The controller is configured to determine the weight distribution directed through the front and rear axles of the machine based in part on the dynamic positioning of the work implement.

20 Claims, 3 Drawing Sheets

(56) References Cited

U.S. PATENT DOCUMENTS

| | | | |
|---|---|---|---|
| 2012/0128456 A1* | 5/2012 | Grimes | E02F 3/3411 414/715 |
| 2014/0207346 A1* | 7/2014 | Filla | E02F 3/431 701/50 |
| 2015/0354177 A1* | 12/2015 | Shatters | E02F 3/422 414/21 |
| 2016/0281335 A1* | 9/2016 | Benzal | E02F 9/267 |
| 2018/0073945 A1* | 3/2018 | Kai | E02F 9/20 |
| 2018/0230671 A1* | 8/2018 | Wu | E02F 3/437 |

\* cited by examiner

SYSTEM AND METHOD FOR DETERMINING LOAD DISTRIBUTION ON A MACHINE

CROSS-REFERENCE TO RELATED APPLICATIONS

This patent application claims the benefit of U.S. Provisional Patent Application No. 62/438,882, filed Dec. 23, 2016, which is incorporated by reference.

TECHNICAL FIELD

This patent disclosure relates generally to estimating the forces and loads being applied to and by a mobile work machine and, more particularly, to utilizing those loads to assist in operation of the machine.

BACKGROUND

Various types of machines are utilized to lift and transport materials such as earth, stone, debris, snow, etc., about a work site. For example, a wheel loader is a type of machine equipped with a work implement that includes a bucket attached to a hydraulically or mechanically powered arm or linkage that can be pivotally raised or lowered with respect to the rest of the machine to lift materials from the ground level to an elevated position and deposit the material elsewhere, such as into a dump truck. Wheel loaders and similar machines also include a system for propulsion such as drive wheels operatively associated with a prime mover such as an internal combustion engine through a powertrain to enable movement of the machine about the worksite. Operation of the machine in lifting and moving materials results in various loads and forces acting on or generated by the machine that change or vary over time depending upon the particular operation the machine is conducting. These dynamically changing loads and forces in turn can affect the operation of the machine, for example, by altering the power requirement allocation among various machine subsystems or changing the efficiency of the machine. Under certain circumstances, the loads may exceed the capacity of the machine causing it to stall or possibly resulting in physical damage to the machine.

Accordingly, systems and methods have been developed to dynamically measure or monitor the loads and forces applied by or on the machine and use that information to assist in operation of the machine. In some of these systems, the forces are measured indirectly using the position or speed of different components or equipment on the machine to estimate the current forces being generated or applied. An example of one system for indirectly monitoring forces is described in U.S. Pat. No. 6,234,254 ("the '254 patent"). The '254 patent describes a system and method for controlling torque generation and distribution in a machine by monitoring operation of a work implement and of an engine associated with the machine. The '254 patent utilizes that information to help improve the efficiency of the machine. The present disclosure is similarly directed to indirectly estimating specific forces and loads applied to a machine through information regarding the speed output or implement position.

SUMMARY

The disclosure describes, in one aspect, a machine including a frame supported on a front axle and a rear axle and a work implement connected to the frame and displaceable by one or more hydraulic actuators to perform a work operation. A hydraulic sensor is associated with the one or more hydraulic actuators to measure a hydraulic force applied to the work implement. The machine also includes a powertrain operatively associated with at least one of the front axle and the rear axle for generating and applying a first directional force to propel the machine over a work surface. To control operation of the machine, an electronic controller can be included that communicates with the hydraulic sensor and that is configured to determine an external vertical force that is applied to the work implement and that is based on the overall hydraulic force and the first directional force. The controller is further configured to determine the distribution of the external vertical force between the front axle and the rear axle.

In another aspect, the disclosure describes a method for determining load distribution between the front axle and the rear axle of a machine. The method involves measuring a hydraulic force associated with a work implement that is hydraulically-powered on the machine. The method determines a first directional force associated with a powertrain of the machine that propels the machine with respect to the ground. The method then calculates an external vertical force associated with the work implement based on the hydraulic force and the first directional force. The method then determines the distribution of the second hydraulic force component as applied between the front axle and the rear axle.

In yet a further aspect, the disclosure describes a system for preventing a machine from tilting about a front axle. The machine includes a work implement connected to a frame and displaceable with respect to the frame by operation of a hydraulic actuator. The system utilizes a hydraulic sensor operatively associated with the hydraulic actuator to measure a hydraulic force applied to the work implement. The system also uses an implement position sensor that measures the angular lift position of the work implement relative to a frame of the machine. To propel the machine, a powertrain directs a first directional force to at least one of a front axle and a rear axle on the machine. To process information regarding the potential of the machine to tilt about the front axle, an electronic controller is included that communicates with the hydraulic sensor, the implement position sensor, and the powertrain. The electronic controller is configured to determine a front axle moment applied to the front axle and to compare the front axle moment with a tilting force threshold.

DETAILED DESCRIPTION

Figure 1:
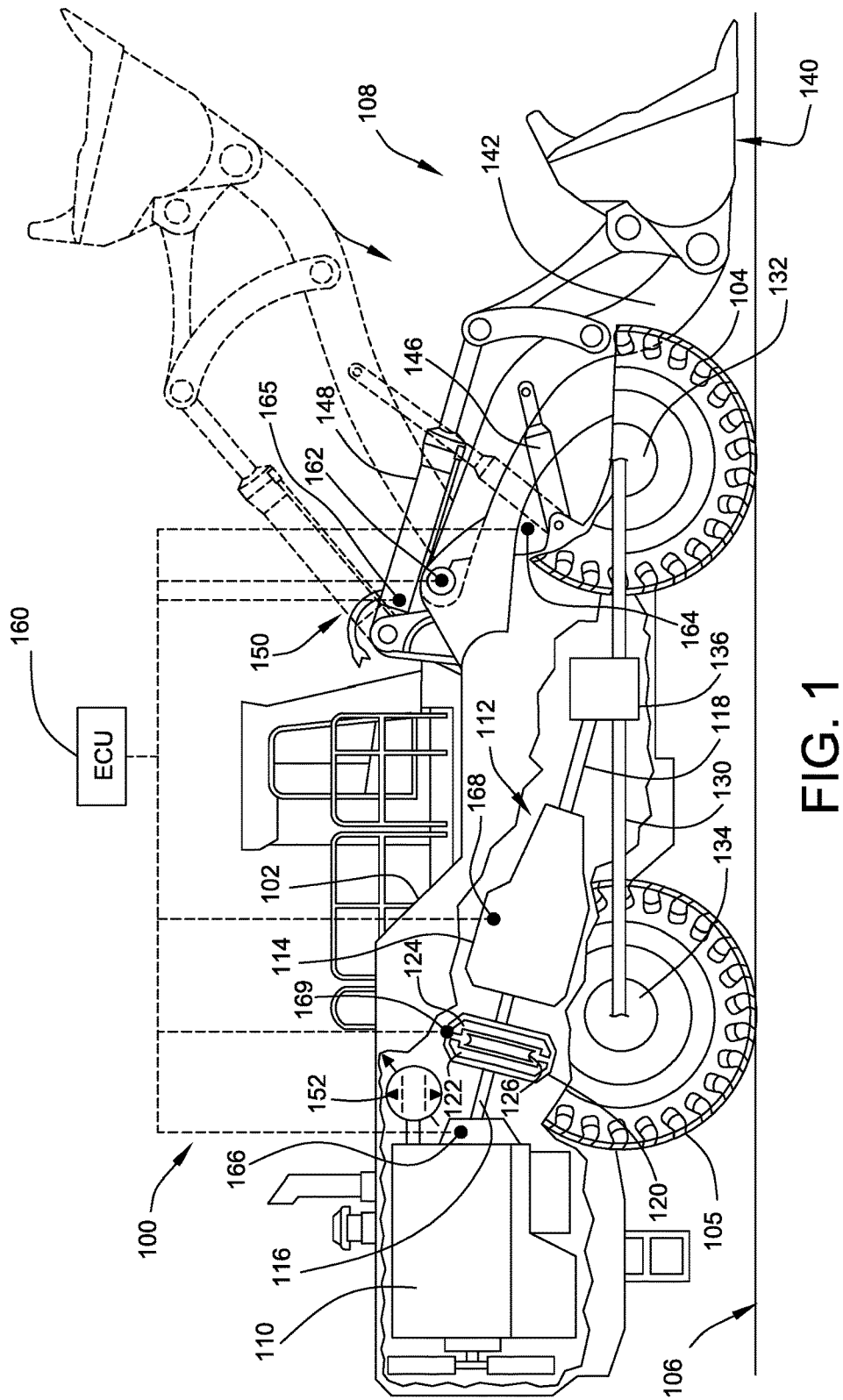
FIG. 1 is a schematic representation of an embodiment of a work machine in the form of a wheel loader illustrating different components and implements for operating the machine.

Now referring to the drawings, wherein like reference numbers refer to like elements, there is illustrated an embodiment of a machine 100 in the particular form of a wheel loader for lifting and moving material about a worksite. To accomplish these tasks, the machine 100 includes a frame 102 supported on a plurality of wheels including at least front wheels 104 and rear wheels 105 for propelling the machine 100 over the ground 106 and a work implement 108 in the form of a loader for lifting material with respect to the ground 106. In addition to a wheel loader, however, aspects of the disclosure may be applicable to other types of machines including, for example, dump trucks, excavators, bulldozers, and the like. As used herein, the term "machine" may refer to any machine that performs some type of operation associated with an industry such as mining, construction, farming, transportation, or any other industry known in the art. Further, in addition to loaders, other types of work implements may be utilized for compacting, lifting, brushing, and may include, for example, compactors, forked lifting devices, brushes, grapples, cutters, blades, breakers/hammers, augers, and others. Further, while the present embodiment of the machine shows front and rear wheels 104, 105, it should be appreciated that the machine may include different numbers of wheels, or may be supported by different propulsion arrangements such as, for example, continuous tracks.

To generate power for operating the machine 100, a prime mover in the form of an engine 110 such as an internal combustion engine may be included. The engine 110 combusts hydrocarbon-based fuels to convert the potential chemical energy therein to rotational power or torque the machine 100 can harness for other work. Examples of suitable fuels to combust include diesel, gasoline, or less traditional fuels such as biofuels, natural gas, etc. In addition to an internal combustion engine, other types of 0 or prime movers include gas turbines, electric motors, steam engines, and the like. While the illustrated embodiment shows the engine 110 disposed on the frame 102 proximately above the rear wheels 105, the engine 110 in other embodiments may be located at other positions on the frame 102. To transmit the rotational motion and torque generated by the engine 110 to the other components such as the front and rear wheels 104, 105 of the machine 100, a powertrain 112 may be operatively associated with and disposed between the engine 110 and the front and rear wheels 104, 105. The powertrain 112 can include various shafts, couplings, and components to alter or adjust the speed and/or direction of the rotational output of the engine 110.

For example, to adjust the speed ratio output from the engine 110, a transmission 114 can be operatively coupled to an engine output shaft 116. The transmission 114 may include internal gears or other components arranged to increase or decrease the rotational speed measured in revolutions per minute (RPM) and, in an inverse relation, the torque measured in foot-pounds (ft-lbs) or Newton-meters (N-m), received from the engine output shaft 116 prior to transferring the adjusted rotational output to a transmission output shaft 118. In various embodiments, the transmission 114 can selectively adjust speed via a plurality of fixed gear ratios using preselected gear pairings or the transmission 114 can be a continuously or infinitely variable transmission that is able to adjust speed over a continuous range using, for example, planetary gears or using other arrangements such as hydraulic or electrical power couplings. To operatively decouple the engine 110 from the transmission 114 and other components of the powertrain 112, for example, when the machine is temporally stopped or idle, a torque converter 120 can be disposed between the engine 110 and the transmission 114. The torque converter 120 can be a form of fluid coupling disposed along and mechanically separating the engine output shaft 116. In an embodiment, the torque converter 120 can have a fluid-filled housing enclosing an impeller 122 receiving rotational motion from the engine 110, a turbine 124 directing rotational motion to the transmission 114 and arranged in an opposing relation to the impeller 122, and a stator 126 that is rigidly fixed in position between the impeller 122 and turbine 124. The impeller 122 and turbine 124 are adapted to allow variable relative rotation between each other with the rotational speed difference being dissipated in the fluid. In various embodiments, the quantity of relative rotation or slippage the torque converter 120 allows can be selectively varied using an impeller clutch that locks or releases the impeller 122 with respect to the housing of the torque converter 120. In other embodiments, the torque converter 120 may include a lockup clutch that rigidly locks the impeller 122 and the turbine 124 together so slippage does not occur between the components, thereby reducing efficiency losses in the torque converter 120.

In an embodiment, both the front wheels 104 and rear wheels 105 can be drive wheels and can receive rotational power from the powertrain 112 to propel the machine 100 over the ground 106, i.e., a four-wheel drive machine 100. To transmit rotation and torque from the transmission output shaft 118 to the front and rear wheels 104, 105, a final drive shaft 130 is operatively coupled via differentials, universal joints, or the like to a perpendicularly arranged front axle 132 associated with the front wheels 104 and a similarly arranged rear axle 134 associated with the rear wheels 105. The front and rear wheels 104, 105 as coupled to the front and rear axles 132, 134 support the weight of the machine 100 on the ground 106. The final drive shaft 130 therefore extends the length of the machine 100 while the front axle 132 and rear axle 134 redirect torque and motion to the respective front and rear wheels 104, 105 disposed on the sides of the machine 100. In an embodiment, to transfer torque and rotation from the transmission output shaft 118 to the final drive shaft 130 which may not be operatively aligned with each other, a gearbox 136 can be disposed to redirect and complete the torque transmission. The gearbox 136 can redirect and transmit torque to the front axle 132 and rear axle 134 at a constant or fixed or set ratio, while in other embodiments, the gearbox 136 can vary the torque ratio transmitted to the front and rear axles to enable the front and rear wheels 104, 105 to rotate at different speeds. The final drive shaft 130 and the front and rear axles 132, 134 can be supported to rotate with respect to the frame 102 by bushings, bearings, washers and the like.

To lift and transport material, the hydraulically-actuated work implement 108 can include a bucket 140 operatively coupled to one or more elongated arms configured as an implement linkage 142 that is pivotally connected to the frame 102 of the machine 100 at a pivot point 144. The bucket 140 is a hollow, box-like structure configured to receive and contain material removed from the ground 106 and the implement linkage 142 can pivotally move the bucket 140 between a lowered position indicated by the solid lines and a raised position or lift position indicated in dashed lines. To pivotally lower and raise the implement linkage 142, the implement linkage 142 can be operatively associated with one or more hydraulic actuators 146 that may be in the form of a telescoping hydraulic cylinder. In an embodiment, the hydraulic actuator 146 can be configured as a double-acting hydraulic cylinder with a cylinder housing having a piston connected to a rod reciprocally disposed therein. Hydraulic pressure directed to or discharged from the hydraulic actuator 146 selectively articulates the implement linkage 142 with respect to the pivot point 144. To tilt the bucket 140 with respect to the implement linkage 142, for example, to dump material, a second hydraulic actuator configured as a tilt actuator 148 can be operatively associated with the bucket 140 and implement linkage 142. To provide the hydraulic pressure, a hydraulic system 150 including fluid lines fluidly connected to a hydraulic pump 152 can be associated with the machine 100. The hydraulic pump 152 may be coupled to and driven by the engine 110. In other embodiments of the machine 100, the work implement 108 can be configured for other operations such as digging as with an excavator, dumping as with a dump truck, or skid-loading as with a forklift. In other possible embodiments, the work implement may be actuated by other methods such as direct mechanical connections or electrical motors.

To facilitate and coordinate operation of the various components of the machine 100, the machine 100 can include an electronic control unit ("ECU"), computer module, or an electronic controller 160, which is represented schematically in FIG. 1. The electronic controller 160 can have any suitable computer architecture and can be in electronic communication with the various components on the machine 100 to send and receive electronic signals in digital or analog form with the components that enable the electronic controller 160 to monitor and regulate the operations and functions of the machine. The electronic controller 160 may execute and process functions, steps, routines, control maps, data tables, charts, and the like saved in and executable from computer readable and writable memory or another electronically accessible storage medium to control the machine 100. To perform these functions and operations, the electronic controller 160 can be configured as a microprocessor, an application specific integrated circuit ("ASIC"), or other appropriate circuitry and may have memory or other data storage capabilities. The memory can include any suitable type of electronic memory devices such as random access memory ("RAM"), read only memory ("ROM"), dynamic random access memory ("DRAM"), flash memory and the like. Although in the schematic representation of FIG. 1, the electronic controller 160 is represented single, discrete unit, in other embodiments, the electronic controller and its functions may be distributed among a plurality of distinct and separate components.

The electronic controller 160 can be further configured to communicate with the various components, systems, and implements on the machine 100 via any suitable communication protocol or design such as digital or analog signals sent over electrical wiring, fiber optics, network buses or the like. Communication between the electronic controller 160 and the components may occur via various sensors and controls, which may be electrical sensors, mechanical sensors, or combinations thereof. For example, to determine the position of the hydraulically-actuated work implement 108, the electronic controller 160 can be in electrical or electronic communication with an implement position sensor 162 operatively associated with the implement linkage 142. The implement position sensor 162 can be a mechanical device that measures the angular lift position of the implement linkage 142 as articulated about the pivot point 144 with respect to the frame 102 of the machine 100.

In addition to the implement position sensor 162, the electronic controller 160 may be in communication with a hydraulic sensor 164 that measures hydraulic pressure or force present in the hydraulic actuator 146. The hydraulic pressure or force represents the extension or retraction of the hydraulic actuator 146 and is indicative of the load being applied due to the weight or mass of the bucket 140, implement linkage 142, and any material in the bucket 140. The electronic controller 160 can also be operatively associated with a tilt actuator sensor 165 that measures the hydraulic pressure or the angular position of the tilt actuator 148 to determine the angular tilt position of the bucket 140 with respect to the implement linkage 142.

To control operation of the engine 110, in particular to determine and regulate the output speed of the engine 110, the electronic controller 160 may be in communication with an engine control 166 operatively associated with the engine 110. The engine control 166 or part of it may be configured as magnetic pickup sensors that measure the engine speed by reading the rotations-per-minute of the engine output shaft 116. The engine control 166 can therefore regulate and report the output speed of the engine output shaft 116 to the electronic controller 160. The electronic controller 160 can also be in electronic communication with the other components of the powertrain 112 including a transmission control 168 that regulates operation of the transmission 114 including gear selection and determining the speed ratio, a torque converter control 169 that regulates operation of the torque converter 120 including the fluid resistance therein, and a gearbox control that can regulate operation of the gearbox 136.

Figure 2:
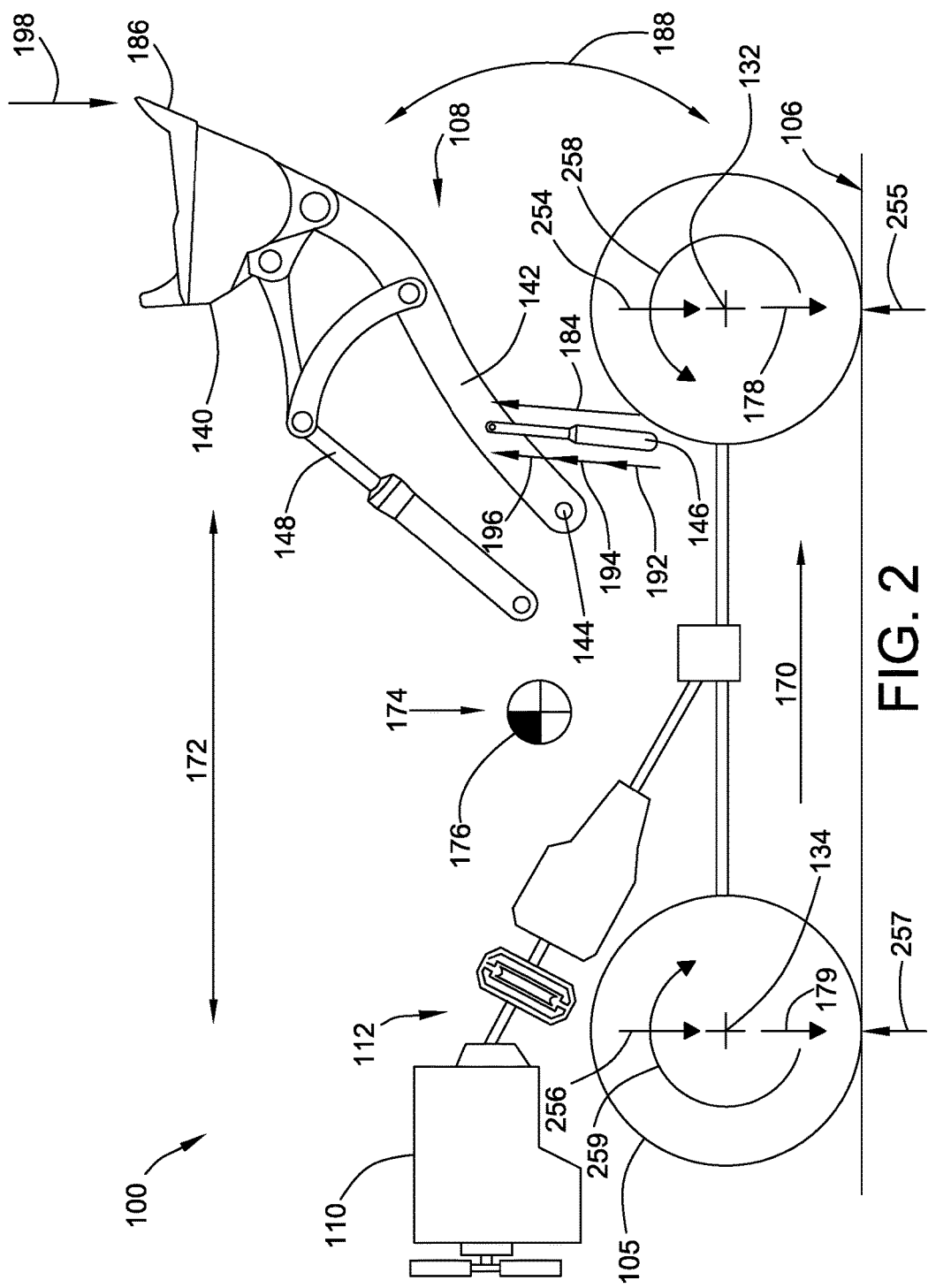
FIG. 2 is a schematic representation of the powertrain and work implement of the machine illustrating various forces and loads that are applied during operation.

Referring to FIG. 2, there is illustrated a schematic representation of the dynamic forces and loads that may be applied through the frame 102 of the machine 100 during operation. To propel the machine 100 over the ground 106, the powertrain 112 generates a torque, or first directional force 170 that is applied through the front and rear wheels 104, 105 to move the machine 100 in the desired travel direction. For reference purposes, the travel direction 172 may be considered the forward and reverse directions horizontally over the ground 106 and the first directional force 170 may be arranged in parallel to the travel direction 172, i.e., horizontal to the ground 106. The first directional force 170 may be analogous to the rim pull torque, which includes the power or drive torque between the front and/or rear wheels 104, 105 and the ground 106. For example, increasing the rim pull torque is meant to increase the forward force of the machine 100 as transferred to the ground 106. Operation of the powertrain 112 is regulated to adjust the first directional force 170 or rim pull torque.

In addition to the first directional force 170, the mass or weight of the machine 100 (minus the work implement 108) may constitute a second directional force 174 aligned in the vertical direction normal to the horizontal ground 106. The second directional force 174 may be concentrated at a center of gravity 176 and is supported by the front and rear wheels 104, 105 through the respective front and rear axles 132, 134. The second directional force 174 can therefore be divided into a front axle load 178 and a rear axle load 179 that are applied through the front and rear wheels 104, 105 normal to the ground 106.

In addition to the foregoing, the work implement 108 and its operation applies other forces and loads to the machine 100. Depending on its position and task, the work implement 108 may generate a third force that is arranged in both the horizontal and vertical directions and further may be applied through the hydraulic actuator 146. Because it is applied primarily through the hydraulic actuator 146, the third force may be referred to as the hydraulic force 184 and may proportional to the hydraulic pressure in the hydraulic actuator. The hydraulic force 184 may include the mass or weight of the work implement 108, including the bucket 140, the implement linkage 142, any material contained in the bucket 140 and any additional forces applied to the bucket from, for example, engaging a bank wall or the like that may be concentrated, theoretically, at the tip or blade edge 186 of the bucket 140. The hydraulic force 184 may also include a component that is equal to and opposite of the first directional force 170 output from the powertrain 112 to propel the machine 100. The hydraulic force 184 may be increased, if, for example, the work implement 108 is pushed into a pile of material on the ground 106.

Accordingly, the hydraulic force 184 may be resolved into a first hydraulic force component 192 corresponding to the first directional force 170 as applied to the hydraulic actuator 146 and a second hydraulic force component 194 that is the result of the weight or mass of the bucket 140 and the implement linkage 142. The hydraulic force 184 may also be the result of a third hydraulic force component 196, resulting from the material in the bucket 140. The third hydraulic force 196 therefore corresponds to the material mass and any other applied forces the bucket 140 encounters during a digging operation, i.e., the external vertical forces 198, that may be concentrated, theoretically, at the tip or blade edge 186 of the bucket 140 accounting for any gain or advantage because of the leverage distance between the location of the hydraulic actuator 146 and the blade edge 186 of the bucket 140. The first hydraulic force component 192, the second hydraulic force component 194, and third hydraulic force component 196 are diagrammatically represented by vector arrows in FIG. 2 oriented parallel with the hydraulic force 184

The hydraulic force 184 resulting from the first hydraulic force component 192, the second hydraulic force component 194, and third hydraulic force component 196 may be dynamic and change in dependence upon the operation and angular position of the work implement 108. Moreover, the ratios or proportions of the first hydraulic force component 192, second hydraulic force component 194, and third hydraulic force component 196 can dynamically change with respect to each other as the angular position of the work implement 108 changes with respect to the machine 100. Further, as the work implement 108 is lifted up and down with respect to the ground 106 and the magnitude and the orientation of the hydraulic force 184 changes dynamically, that may also effect the center of gravity 176 of the machine 100 or cause the center of gravity 176 to shift in position with respect to the machine 100. The hydraulic force 184 resulting from the first hydraulic force component 192, the second hydraulic force component 194, and third hydraulic force component 196 further affects the first directional force 170 and second directional force 174 applied to the machine 100. Because this affects the load and force distribution applied to the machine, which may affect the balance of the machine, the disclosure presents a system and process for estimating the dynamic nature of these forces.

INDUSTRIAL APPLICABILITY

Figure 3:
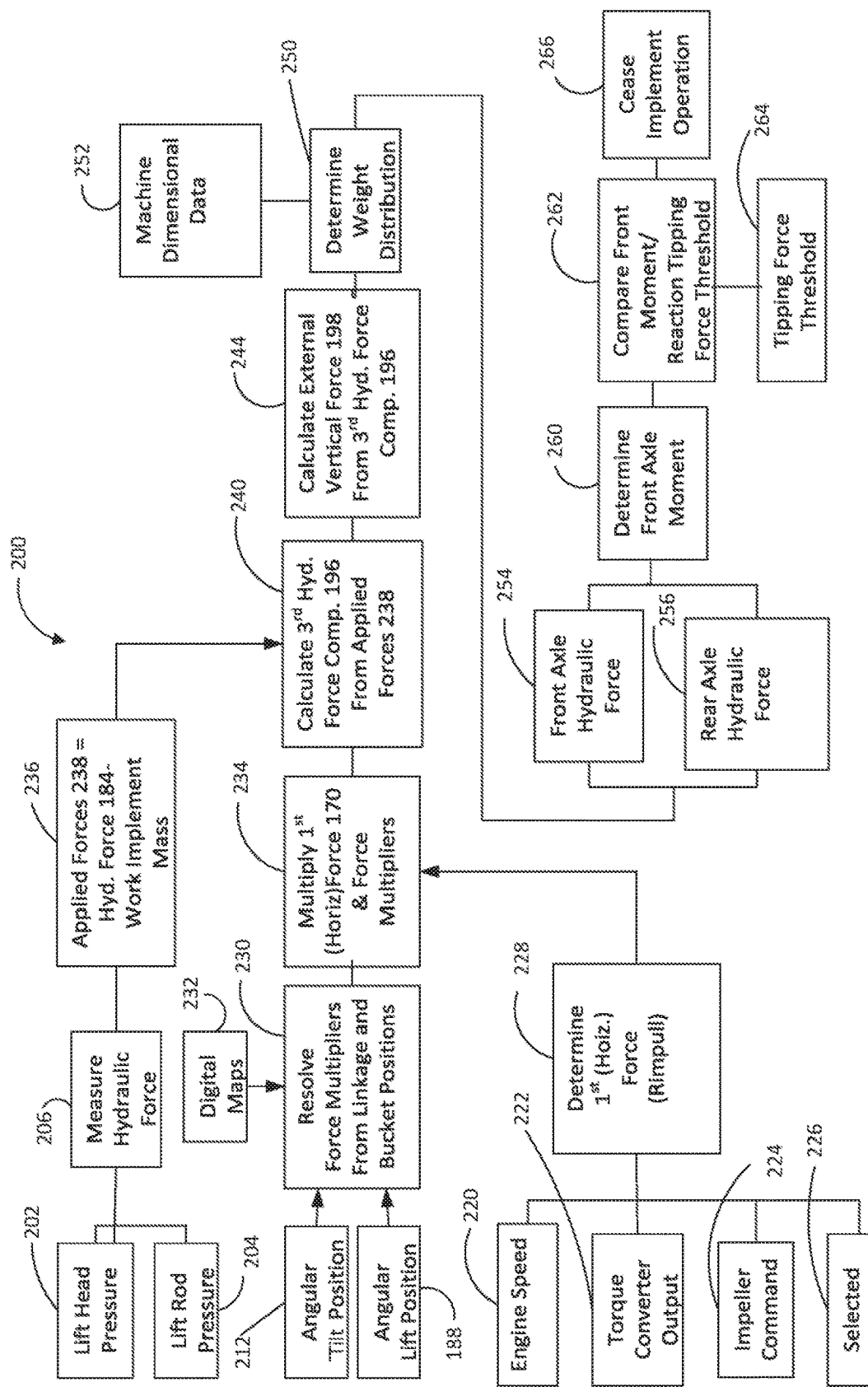
FIG. 3 is a flow diagram of possible steps or processes for determining load distribution about the machine with a further embodiment to prevent tipping or tilting of the machine during a loading operation.

Illustrated in FIG. 3 is a logic diagram or flowchart of a routine or process 200 that the electronic controller of the machine may carry out to determine the distribution of loads and forces applied to the machine. The process 200 can be embodied as software instructions or programming that the electronic controller executes to resolve the steps described herein and determine the load distribution of the machine. Referring to FIGS. 2 and 3, to determine the hydraulic force 184 applied by the work implement 108, the process 200 can first measure the fluid pressure or force in the hydraulic actuator 146 which may be in pounds per square inch (PSI). In a preferred embodiment, where the hydraulic actuator 146 is a double acting cylinder, this may involve sensing both a lift head pressure 202 on the head-side of the cylinder and a lift rod pressure 204 on the rod side of the cylinder. The lift head pressure 202 and the lift rod pressure are directed to a measurement step 206 that combines the information to measure the hydraulic force 184. However, in other embodiments of the hydraulic actuator 146, the hydraulic force 184 can be obtained through other methods. In addition to the hydraulic force 184, the process 200 can obtain other information regarding the angular lift position 188 of the work implement 108 with respect to the frame 102 and the ground 106. The angular lift position 188 represents the articulated position of the work implement 108 with respect to the ground 106. The tilt position 212 of the bucket 140 can be obtained from the appropriate sensors disposed on the work implement 108.

To calculate the first directional force 170 applied by the machine 100 to the ground 106, the process 200 can receive information from the powertrain 112 including the engine speed 220 output from the engine 110, which may be measured in RPM. Using torque-speed curves associated with the powertrain 112 that may be in the form of digital maps, the process 200 can determine the torque capacity of the engine 110 for that engine speed. In embodiments utilizing a torque converter and/or gear-set transmission, as opposed to continuously variable transmissions or fixed ratio transmissions, the process 200 can also receive the torque converter output speed 222 from the torque converter 120 in RPM, which represents the rotational speed input to the transmission 114. In the embodiments in which the torque converter 120 is equipped with an impeller clutch to vary the slippage, the process 200 can also receive an impeller clutch command 224 indicative of the engagement of the impeller clutch associated with the torque converter 120. From the transmission control 168 associated with the transmission 114, the process 200 can also receive the selected gear 226 that represents the speed and torque ratios currently selected for the transmission 114. In a calculation step 228, the process 200 can calculate the rim pull torque that the powertrain 112 is generating at a particular instance. The calculated rim pull torque may equate to the first directional force 170 applied by the machine 100 horizontally with respect to the ground 106. In further embodiments, the calculation step 228 may account for additional factors that affect the first directional force 170 such as horizontal acceleration or wheel friction.

To account for the effect of the angular lift position 188 of the work implement 108 on application of forces about the machine 100, the process 200 must relate the angular lift position 188 to the first, second and third hydraulic force components 192, 194, 196. This is because the angular lift position 188 of the work implement 108 relates to and affects the magnitude of the first, second and third hydraulic force components 192, 194, 196. In other words, the ratio of the first, second and third hydraulic force components 192, 194, 196 when the work implement 108 is fully raised will be different than when the work implement is lowered to the ground. Furthermore, these ratios dynamically change with changes in the angular lift position 188. To account for the angular lift position 188, the process 200 can utilized predetermined digital maps 232, readable by the electronic controller, that can include kinematic or statics information that relates different angular lift positions 188 with particular ratios of the forces applied to the work implement 108 including the first, second and third hydraulic force components 192, 194, 196 of the hydraulic force 184. The information contained in the digital maps 232 may be determined experimentally during the design of the machine 100. The process 200 can utilize the digital maps 232 in a resolution step 230 to determine the relevant kinematic relations in terms of force multipliers associated with the angular lift position 188 of work implement 108 at the relevant time.

The process 200 can use the measured hydraulic force 184 from measurement step 206, the calculated first directional force 170 calculated in the calculation step 228, and the kinematic relations or force multipliers relating the applied forces at different dimensional locations as determined in the resolution step 230 to determine the external vertical forces 198 applied to the bucket 140. The process can apply the following exemplary equation to make this determination:

$$F_{Hyd.\ Cyl.\ 184} = K_{weight} * W_{implement} + \uparrow K * F_{3rd\ Direction\ 198} + \rightarrow K * F_{1st\ Direction\ 170} \quad \text{(Eqn. 1)}$$

Where:

$F_{Hyd.\ Cyl.\ 184}$ is the Hydraulic Force 184;

$F_{1st\ Direction\ 170}$ is the first directional force oriented horizontally;

$F_{3rd\ Direction\ 198}$ is the vertical force 198 in the bucket;

$\uparrow K$ is the vertical external force multiplier or ratio;

$\rightarrow K$ is the horizontal force multiplier or ratio;

$K_{weight}$ is the implement weight multiplier or ratio; and $W_{Implement}$ is the weight of the work implement 108 oriented vertically.

The above equation can be rearranged to solve for the external vertical forces 198 acting on the bucket 140.

The hydraulic force 184 may be attributable to three components: the weight of the work implement 108 (i.e. the bucket 140 and the implement linkage 142), the external vertical force 198 on the bucket 140, and the first directional force 170. The weight or mass of the work implement 108 corresponds to the second hydraulic force component 194 described above and can be known from or predetermined by the design of the machine 100. Accordingly, in a subtraction step 236, the applied forces 238 applied to the work implement 108, which may correspond to the first and third hydraulic force components 192, 196, can be determined by the following equation:

Applied Forces 238=Hyd. Force 184−2nd Hyd. Force Comp. 194 (Eqn. 2)

Depending upon the angular lift position 188 of the work implement 108 with respect to the frame 102 and the ground 106, the first directional force 170 may be a larger or smaller component of the overall hydraulic force 184. To determine the portion of the first directional force 170 attributable to the hydraulic force 184 for a particular angular lift position 188, the process 200 in a multiplication step 234 can multiple or otherwise compare the first directional force 170 with the horizontal force multiplier →K determined in the resolution step. This corresponds to the first hydraulic force component 192. After determining the portion of the first directional force 170 attributable to the total hydraulic force 184, the process 200 performs a calculation step 240 to calculate the remainder of the applied forces 238 of the hydraulic force 184, which corresponds to the third hydraulic force component 196. In particular, calculating the third hydraulic force component 196 can be accomplished by subtracting the relevant allotment attributable to the first directional force 170, e.g., the first hydraulic force component 192, from the applied forces 238 determined above according to the possible equation:

3rd Hyd. Force Comp. 196=Applied Forces 238− →K*F<sub>1st Direction 170</sub> (Eqn. 3)

The weight or mass of the material in the bucket 140, and any additional forces applied to the bucket 140, corresponds to the third hydraulic force component 196 described above. Accordingly, in a second calculation step 244, the process 200 calculates the external vertical force 198 on the bucket from the third hydraulic force component 196, determined by equation 3 above by accounting for any mechanical gain or advantage because of the leverage distance between the actuator 146 and the bucket 140, represented by the vertical force multiplier ↑K, according to the following equation:

External Vertical Force 198=3rd Hyd. Force Comp. 196*↑K (Eqn. 4)

The process 200 can next determine how the external vertical force 198 on the bucket and the angular lift position 188 affects the weight or load distribution on the machine 100 in a weight determination step 250. To determine the weight or load distribution, the weight determination step 250 can receive machine dimensional data 252 that reflects the dimensions associated with the machine 100 and which can be determined through its design. In particular, the machine dimensional data 252 can reflect the dimensions between the work implement 108 and the front and rear axles 132, 134. The weight determination step 250 uses the machine dimensional data 252 to resolve how much of the external vertical force 198 will be supported by the front axle 132 and how much will be supported by the rear axle 134. The result of the weight determination step 250 is a front axle force 254 and a rear axle force 256 that reflect the portion of mass of the work implement 108 and the external vertical force 198 that are directed through the respective front and rear wheels 104, 105 of the machine 100. The front axle force 254 attributable to the work implement 108 can be added to the front axle load 178 resulting from the mass of the rest of the machine 100 and the rear axle force 256 can be added to the rear axle load 179 attributed to the mass of the rest of the machine 100. Applying statics conventions, the front axle load 178 including the front axle force 254 results in a counterforce or front axle reaction force 255 directed upwards from the ground 106 and the rear axle load 179 including the rear axle force 256 results in a counterforce or rear axle reaction force 257 also directed upwards from the ground 106.

As part of determining the front axle force 254 and rear axle force 256, the process 200 can perform a moment determination step 260 to determine a front axle moment 258 and a rear axle moment 259 due to the mass and angular lift position 188 of the work implement 108 that are applied about the front and rear axles 132, 134 respectively. The moment determination step 260 can be conducted using the machine dimensional data 252 and mechanical equations. The moment determination step 260 can be conducted as part of the weight determination step 250 by summing the moments arising from the weight of the machine 100 and the first directional force 170 and the external vertical force 198 about the front and rear axles 132, 134 to assist in resolving the front axle load 178 and rear axle load 179. By determining the front and rear axle forces 254, 256 and the front and rear axle moments 258, 259, the process 200 is able to resolve the various loads and weight distribution being applied to the machine 100.

In a further embodiment, the process 200 can conduct additional steps that utilize the information regarding the front and rear axle forces 254, 256 and/or front and rear axle moments 258, 259 to facilitate operation of the machine 100. For example, if the front axle moment 258 applied about the front axle 132 is significant enough, the front axle moment 258 may attempt to tip or tilt the machine 100 about the front axle 132 so that the rear wheels 105 are lifted from the ground 106. In particular, the front axle moments 258 may exceed the rear axle load 179 from the weight of the machine 100 and the rear axle hydraulic force 256 that are applied to the rear axle 134 holding the rear wheels 105 to the ground 106. Understood another way, if the rear axle reaction force 257 is excessive and/or the center of gravity 176 of the machine 100 is shifted too far forward, the rear axle reaction force 257 may tend to tip the machine 100 forward about the front wheel 104. This situation may occur if the work implement 108 is being directed to dig into a hard bank or if the bucket 140 is overfilled with material, which may cause the machine 100 to tilt or rotate about the front wheels 104. The tilting condition may damage the machine 100, especially in the event the machine 100 is allowed to fall back to the ground 106. To prevent such a tilting or tipping condition, the process 200 can conduct another comparison step 262 in which the front axle moment 258 and/or rear axle reaction force 257 as determined above are compared with a tilting force threshold 264 that may be a predetermined value indicating that a tilting condition is about to occur. In the event the front axle moment 258 or the rear axle reaction force 257 exceeds the tilting force threshold 264, the process 200 can conduct a cease implement operation step 266 that ceases or prevents any further attempt to lift or move the work implement 108. The cease implement operation step 266 may be accompanied by a warning alarm to warn the operator of the potential tilting condition.

In addition to inhibiting the tilting condition, the process 200 may perform other steps to assist operation of the machine. For example, because the process resolved the weight distribution or load distribution applied to the machine 100, including determining the front axle load 178 and rear axle load 179, the process 200 can utilize that data to estimate and monitor the rim pull torque distribution between the front and rear axles 132, 134. The rim pull torque applied through the front axle 132 and through the rear axle 134 can be related to the amount of weight that a particular axle is supporting. Because the weight distribution is known, the rim pull torque distribution between the front axle 132 and rear axle 134 can likewise be readily determined. This information can be used to adjust the efficiency of the machine, for example, by determining if one set of wheels is spinning out and directing the operator to adjust operation of machine accordingly.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A machine comprising:
   a frame supported on a front axle and a rear axle;
   a work implement connected to the frame and displaceable with respect to the frame by one or more hydraulic actuators;
   a hydraulic sensor operatively associated with the one or more hydraulic actuators to measure a hydraulic force applied to the work implement;
   a powertrain operatively associated with at least one of the front axle and the rear axle for generating and applying a first directional force for propelling the machine over a work surface;
   an electronic controller communicating with the hydraulic sensor and configured to determine an external vertical force applied to the work implement based on the hydraulic force and the first directional force; and to determine distribution of the external vertical force between the front axle and the rear axle to calculate a front axle force and rear axle force.

2. The machine of claim 1, further comprising an implement position sensor operatively associated with the work implement to determine an angular lift position of the work implement with respect to the frame.

3. The machine of claim 2, wherein the electronic controller further communicates with the implement position sensor and is further configured to determine a front axle moment based on the angular lift position and the external vertical force.

4. The machine of claim 3, wherein the electronic controller compares the front axle moment with a tilting force threshold.

5. The machine of claim 1, wherein the first directional force is a rim pull torque generated by the powertrain.

6. The machine of claim 5, wherein the electronic controller determines the rim pull torque based in part upon variable selected from the group comprising engine speed, transmission gear selection, and impeller clutch command.

7. The machine of claim 1, wherein the electronic controller is further configured to resolve the hydraulic force into a first hydraulic force component associated with first directional force, a second hydraulic force component associated with an empty mass of the work implement, and a third hydraulic force component associated with the external vertical force.

8. A method for determining load distribution between a front axle and a rear axle of a machine, the method comprising:

measuring a hydraulic force associated with a work implement that is hydraulically-powered on the machine;

determining a first directional force associated with a powertrain of the machine;

calculating an external vertical force based on the hydraulic force and the first directional force; and determining distribution of the external vertical force between the front axle and the rear axle to calculate a front axle force and a rear axle force.

9. The method of claim 8, wherein the work implement includes an implement linkage connected to a bucket.

10. The method of claim 9, further comprising measuring an angular lift position associated with the work implement; and determining a front axle moment based on the angular lift position and the external vertical force.

11. The method of claim 10, further comprising comparing the front axle moment with a tilting force threshold.

12. The method of claim 11, wherein the tilting force threshold represents a tilt condition in which the machine may tilt about the front axle.

13. The method of claim 8, wherein the first directional force is generally aligned with a travel direction of the machine, and the external vertical force is generally aligned with a vertical orientation of the machine.

14. The method of claim 8, wherein the first directional force is a rim pull torque generated by the powertrain.

15. The method of claim 14, wherein the first directional force is determined based on variables selected from the group comprising engine speed, torque converter output speed, impeller clutch command, and transmission gear selection.

16. The method of claim 8, wherein the hydraulic force is resolved into a first hydraulic force component associated with the first directional force; a second hydraulic force component associated with an empty mass of the work implement; and a third hydraulic force component associated with the external vertical force.

17. The method of claim 16, wherein the first hydraulic force component is generally parallel with the first directional force.

18. A system for preventing a machine from tilting about a front axle comprising:

a work implement connected to a frame of a machine and displaceable with respect to the frame by operation of a hydraulic actuator;

a hydraulic sensor operatively associated with the hydraulic actuator to measure a hydraulic force applied to the work implement;

an implement position sensor measuring an angular lift position of the work implement relative to a frame of the machine;

a powertrain operatively associated with at least one of a front axle and a rear axle on the machine and configured to generate a first directional force for propelling the machine in a travel direction; and an electronic controller communicating with the hydraulic sensor, the implement position sensor, and the powertrain, the electronic controller further configured to determine a front axle moment applied to the front axle and to compare the front axle moment with a tilting force threshold.

19. The system of claim 18, wherein the electronic controller determines the first directional force based on variable selected from the group comprising engine speed, impeller clutch command, and transmission gear selection; and the electronic controller is further configured to subtract the first directional force from hydraulic force.

20. The system of claim 19, wherein the electronic controller further ceases operation of the work implement if the front axle moment exceeds the tilting force threshold.

* * * * *